Feb. 22, 1955     B. C. VAN OMMEREN     2,702,602
PROPELLER PITCH CHANGE MOTOR

Filed Feb. 10, 1951                       2 Sheets—Sheet 1

INVENTOR
*Bernard Carel Van Ommeren*
BY
*Duell and Kane*
ATTORNEYS

Feb. 22, 1955   B. C. VAN OMMEREN   2,702,602
PROPELLER PITCH CHANGE MOTOR
Filed Feb. 10, 1951   2 Sheets-Sheet 2

INVENTOR
Bernard Carel Van Ommeren
BY Duell and Kane
ATTORNEYS

United States Patent Office 2,702,602
Patented Feb. 22, 1955

2,702,602

PROPELLER PITCH CHANGE MOTOR

Bernard Carel Van Ommeren, Oxon, England

Application February 10, 1951, Serial No. 210,333

Claims priority, application Netherlands February 15, 1950

9 Claims. (Cl. 170—160.33)

The invention relates to a propeller system, particularly for operation in a liquid, such as a ship's propeller, wherein by means of a pitch change motor one or more blades of the propeller may be rotationally displaced about their axes.

Such a pitch change motor for operation by means of a pressure fluid comprises two coaxial members, a cylindrical inner member and a cylindrical outer member housing the inner member, at least one of the members being disposed for rotational displacement relatively to the other member. The inner member is provided on its outer cylinder surface with one or more outwardly projecting vanes which sealingly slide on the inner cylinder surface of the outer member. This outer member, for its part, is provided with an equal number of inwardly projecting abutments which sealingly slide on the outer cylinder surface of the inner member and thus cooperate with, or limit the rotational movement of, the vanes on the inner member when the pressure fluid is admitted to one side and discharged from the other side of the vanes and vice versa.

More particularly, the object of the invention is a specific arrangement of the pitch change motor within the hub proper of the propeller, an arrangement which makes possible to avoid any inactive lengths of the propeller blades, i. e. lengths of the blades which do not contribute to the hydrodynamic conversion of the rotational energy of the propeller into translational energy of the vessel or medium to be moved.

It is a further object of the invention to arrange the pitch change motor with relation to the blade or blades whose pitch is to be controlled or changed, even when the adjusting forces are large, so that the use of parts may be avoided which might be susceptible of damage or might cause interference, or of connections which might work loose. It is thus an object of the invention to arrange the cooperating parts with relation to each other and to the prevailing forces and strains such that the distribution of stresses and surface pressure is as favorable as possible and the frictional losses as low as possible.

A still further object of the invention is the arrangement of both members of the pitch change motor symmetrically within the hub and about the common axis of rotational displacement of the blades such that of a pair of diametrally opposite blades of the propeller one blade may be coupled with, or secured to, or be of one piece with, the one member and the other blade may be coupled with, or secured to, or be of one piece with, the other member of the pitch change motor, both members being rotatably disposed centrally within the hub and rotatably displaceable relatively to each other.

These and further objects and features of the invention will become apparent as the specification proceeds and embodiments of the invention will be more specifically described and illustrated by way of example in and by the accompanying drawings which form part of this specification and which are to be understood explicative of the invention but not limitative of its scope.

Figure 1:
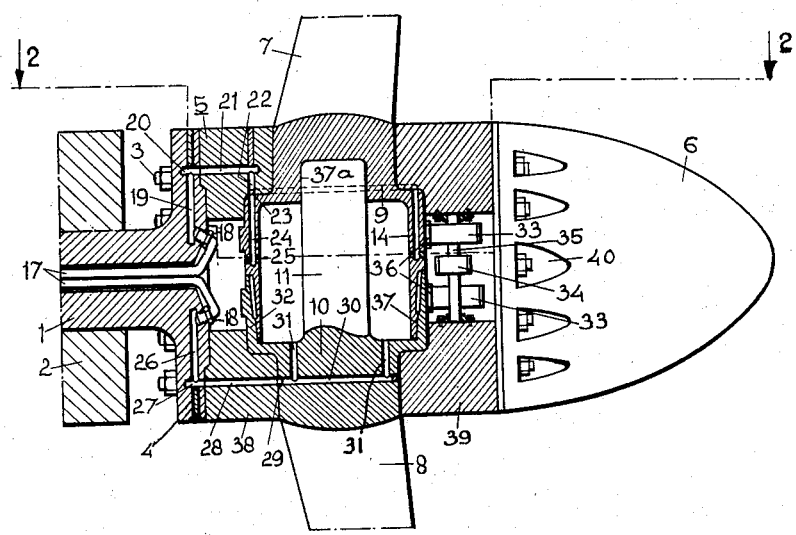
Fig. 1 is a longitudinal section, partially a longitudinal view of a twinblade ship propeller according to the invention.

A propeller shaft 1, which is supported in a known manner in a stern tube 2 of a ship, is connected by means of studs with nuts 3, engaging against a flange-shaped portion 4 of the propeller shaft 1, to a substantially cylindrical hub 5, the other end of which passes in the known manner into a fairing 6. The propeller has two blades 7 and 8, both rotationally displaceable about their axes. To this purpose, the roots of blades 7 and 8 are formed as cylinders or as bodies of revolution so that these roots of the blades serve as journals in conformably shaped bearings of the hub for the rotational displacement of the blades when the pitch of the blades is to be changed. Inside the hub and centrally thereof, there is arranged the pitch change motor comprising a cylindrical outer member 9 integrally formed with the root of blade 7 at the base thereof, and a cylindrical inner member 10 formed at the base of blade 8 integrally with its root. The inner member 10 is formed by a shaft 11 projecting from the base of blade 8. This shaft carries on its outer surface the radially and outwardly projecting vanes 12 disposed diametrically of each other, and immovably connected with each other and with the shaft 11 by means of a nut-bolt structure 13 extending through the vanes and centrally through the shaft 11, as may be seen in Fig. 2. The vanes 12 are identical in shape and lie with their circumferential surfaces against the inner cylinder surface of the outer member so as to seal against it. There may be several nut-bolt structures 13, distributed over the length of the vanes 12. The vanes 12 are substantially trapezoidal in shape of cross-section, so that their side surfaces are directed in planes through the common axis of the members.

The outer, hollow cylindrical member 14 carries two diametrically opposed elements 15, in the following specification and in the claims termed "counter-vanes" in view of their function similar to that of the vanes 12 however for distinguishing them in terminology from those outwardly projecting vanes 12 on the inner member 10. The counter-vanes 15, which are immovably secured in the body of revolution by means of bolt connections 16, extend inwards until they touch and seal against the shaft 11. There may be a number of pairs of bolts 16 along the length of each counter vane 15. Said counter vanes 15 are also substantially trapezoidal in shape of cross-section, so that their side surfaces are directed in planes through the common axis of the members.

The shapes of the vanes 12 of the inner member 10 and of the counter-vanes 15 of the outer member 9 are therefore complementary, i. e. each side of the trapezium of each vane 12 is adapted to fit against one of the sides of the trapezium of each one of the counter-vanes 15.

The propeller shaft 1 is hollow, and through this hollow shaft there are passed two or more conduits 17 for an operating medium under pressure. These conduits are bent in the hub as shown and are attached at 18 to the inner wall of the flange-shaped portion 4 of the propeller shaft 1.

Figure 2:
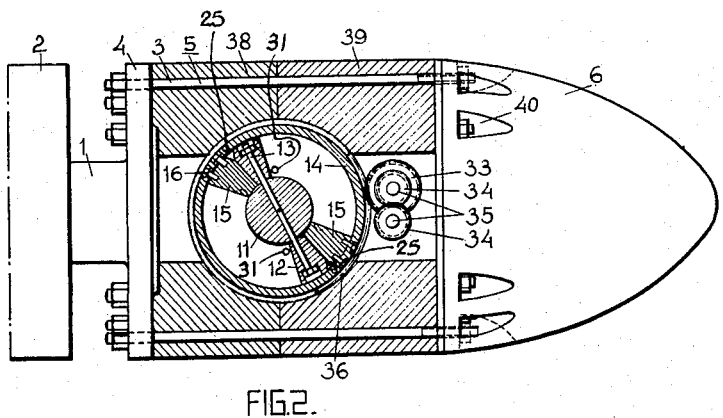
Fig. 2 is a longitudinal section, partially a longitudinal view of the same propeller, on line 2—2 of Fig. 1.

One of the conduits 17, in Fig. 1 the upper one, is connected at 18 to the flanged end 4 of the propeller shaft and leads from there to bores 19, 20 in the propeller shaft and from into the bores 21, 22 in the hub 5. The other conduit 17, in Fig. 1 the lower one, is likewise connected to the flanged end 4 of the propeller shaft, at a point opposite to that first mentioned, and leads from there into the bores 26, 27 in the propeller shaft and then into bore 28 in the hub. The bore 22 ends in a circumferential groove 23, which extends over a circle around the axis of the pitch change motor. In the outer member 14 there are provided two diametrically opposite axial bores 24, opening by transverse bores 25 at the inner cylinder surface of member 14 and into the space between the members. As appears from Fig. 2, the bores 25 open into this space each to the side of one of the counter-vanes 15. In order that the operating fluid may enter the space between adjacent vanes and counter-vanes, when these are in abutment, partial recesses are made in adjacent surfaces of the vanes 12 and of the counter-vanes 15, as shown in Fig. 2.

Bore 28 opens into a circumferential groove 29 in the root of blade 8. This circumferential groove communicates with a bore 30 extended transversely through the root of blade 8 and opening into two longitudinal bores 31. These bores 31 open at the base of blade 8 into the space between the two members of the pitch change motor, as appears clearly from Fig. 2.

The roots of both blades are provided at their bases and the hub within its cavity with oppositely disposed recessed seats on which the blades are seated, rotationally displaceable. From the flange of blade 7, the cylindrical wall 14 of the outer member 9 projects towards blade 8 and bears against its base. The flange of the base of blade 8 has likewise a cylindrical extension or sleeve 32 projecting therefrom towards blade 7 and telescoped over the cylindrical wall 14, covering a part of the length of the outer face of cylinder 14. The free outer faces of both cylindrical extensions carry each a toothed rim 36 which mesh each with a gear wheel 33. These gear wheels 33 are rotatably but not displaceably mounted in the cavity of the hub, each one by a shaft 35. These shafts 35 may freely rotate in the hub 5. The gear wheels 33 thus are in spaced relationship above, and at the side of, each other. Within the space between these gear wheels 33, each shaft 35 carries a gear wheel 34, both gear wheels 34 meshing with each other. By this means the propeller blades, on being adjusted, are forced to rotate the same distance relative to the hub, but in opposite directions.

The inner member 10 is supported in the outer member 9 at 37a at the end of its shaft-shaped part 11, and the hollow cylindrical part 14 of the said outer member 9 is supported at its free end at 37 in the hollow, overhanging section 32 of the inner member 10. Thus, both the blades support each other at their roots and with the members of the pitch change motor serve mutually as journals and bearings for rotational displacement relatively to each other and furthermore are adequately supported at two points spaced a considerable distance from each other, so that the forces produced and the risk of deformation and wear are reduced to a minimum.

The manner, in which the hub 5 is divided and in which the several parts are united, will be explained with particular reference to Figures 2 and 3. The hub 5 is divided into two parts 38 and 39 shaped so as to provide a cavity or chamber for receiving the pitch change motor centrally therein. The bolts of the nut-bolt-connections 3, which hold the parts 38, 39 together, are extended through the flanged portion 4 of the shaft 1, through the parts 38 and 39 and partially through the fairing 6. The said fairing 6 has a number of recesses 40 of a shape as shown in Figures 1 and 2. The bolts extend into these recesses. Both ends of each bolt is screw-threaded and to each such end a nut is secured, so that the parts 14, 38, 39 and 6 are united by these bolts.

The operation of the above specified propeller is as follows. It is assumed, that the blades 7 and 8 of the propeller occupy the position, shown in Figures 1 and 2. If it is further assumed, that the position of the blades has to be changed the following is necessary to obtain this end. Fluid under pressure is admitted through the upper conduit 17, as seen in Figure 1, and the lower conduit 17 is connected to a discharge. These connections are made within the ship by a suitable device, not shown, to which the invention does not relate and which is known per se. From the upper conduit 17 the fluid under pressure flows through connection 18, bores 19, 20, 21 and 22 to the circumferential groove 23 and from said groove through the bores 24 to the openings 25. Thereby a pressure is built up between abutting vanes 12 and counter-vanes 15. These vanes and counter-vanes are thereby pressed asunder. The operating fluid in the spaces between each vane 12 and counter-vane 15, not abutting therewith, is displaced from said spaces by the relative movement of the vanes 12 and the counter-vanes 15 and this fluid thereby leaves said spaces through bores 31, 30, groove 29, bores 28, 27, 26, connection 18 and lower conduit 17, through which it flows through the propeller shaft back into the ship and to a discharge.

If fluid under pressure is supplied during a sufficient time interval both members rotate in opposite senses until the vanes 12 abut against the other sides of the counter-vanes 15. If, however, it is desired to adjust the propeller blades in a position between their extreme positions it is in most cases sufficient to let the pressure of the operating fluid drop to zero. The blades will then not rotate any more after such pressure drop and will be maintained in the adjusted position by friction and by the action of the synchronizing gear wheel mechanism 33, 34, 35. It has appeared, that in most cases friction is sufficient to maintain the blades in the adjusted position. If friction should not be sufficient, it is possible to apply a brake to the members, which secures them in the desired position. Such brake may be either hand-controlled or may be operative automatically upon pressure drop of the operating fluid.

Figure 3:
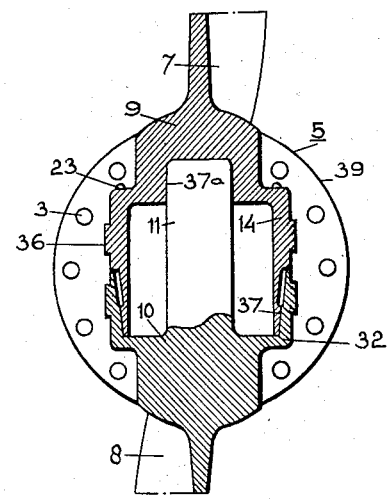
Fig. 3 is a cross-section in a radial plane of the propeller through the blade axes.
Figure 4:
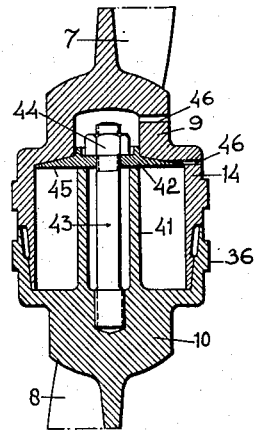
Fig. 4 is a similar cross-section as Fig. 1, but of another embodiment of the propeller and only through a limited part of said propeller.

Fig. 4 shows part of a propeller, namely the rotary members of the pitch change motor with part of the propeller blades, in longitudinal section through the axis of the motor, according to an embodiment, which differs from the embodiment of Figures 1 to 3.

The blades in Figure 4 are also indicated with reference numerals 7 and 8 respectively. Inside the hub the blade 7 has an outer member 9 and the blade 8 has an inner member 10 of a pitch change motor. The structure of these members 9 and 10 is the same as the structure of the corresponding members 9 and 10 of Figures 1 to 3 inclusive, but for the shaft 11 of said former figures, which is replaced according to Fig. 4 by a structure now to be described. Rotary member 10 has an integral sleeve-like coaxial part 41. An annular space is left between this part 41 and the inner face of member 9. A disk 42 rests upon the sleeve-like part 41 and fits along its outer periphery within the cylindrical part 14 of member 9. A stud bolt 43 is screwed into the bottom of the sleeve 41 and extends through said sleeve and out of it through a hole in the disk 42. A nut 44 is screwed upon the end of the bolt. Vanes 12 and counter-vanes 15 are arranged, corresponding to the vanes 12 and counter-vanes 15 according to Figures 1 to 3. The vanes 12 are secured to the sleeve 41 and the counter-vanes 15 to the cylindrical part 14. The vanes 12 and counter-vanes 15 are in sealing contact with the face 45 of the disk 42, in such a manner that the counter-vanes 15 can slide along the face 45 of the disk 42. When disassembling the rotor structure the counter-vanes 15 are loosened from the cylindrical part 14 by removing bolts such as the bolts 16 shown in Figure 2. Thereupon the two rotary members can be moved one out of the other in opened position of the hub. Assembly can take place by combining member 10 with disk 42 etc. and vanes 12 to a unit and by placing counter-vanes 15 in the correct position in the member 10. This member is then moved axially into member 9, whereupon the counter-vanes 15 are secured to the cylindrical part 14 of member 9 by the bolts 16. If fluid under pressure leakes from the space between the members along the contact surface between the disk 42 and the cylindrical part 14, this fluid should be removed to prevent the building up of pressure behind the disk 42. To this end one or more bores 46 is provided in the cylindrical part 14 to lead leakage fluid away to a suitable discharge.

The advantage of this embodiment of Fig. 4 is, that there is no resulting pressure, which might press the members from each other in the direction of their axes.

Within the scope of the invention several other embodiments may, of course, be chosen.

If, for example, there is only one rotatable propeller blade in one particular point along the centre line of the hub, the inner or the outer member may be stationary and secured in the hub. The operation and the design of the apparatus then remain fundamentally identical, but in this case it is obvious that no synchronizing device as illustrated (33, 34, 35) is required.

If it should be desired to provide two or more propeller blades or sets of propeller blades in various points along the centre line of the hub, the invention can also be applied advantageously, both when the centre lines of the propeller blades run through the centre line of the hub in different planes and when they are in the same plane. In this case a synchronizing device which synchronizes the different propeller blades and/or sets of propeller blades with each other can obviously be used.

The propeller blades can be provided in the known manner with a locking device, so that after they have reached the adjusted position they are locked and kept locked until a fresh adjustment has to be effected. This locking device can be automatically actuated in the known manner when the pressure of the operating medium, by which the blades were adjusted, falls away.

Means may be provided for indicating the position of the propeller blades inside the ship. The supply and discharge of the operating medium from and to the ship may be effected in the known manner through perforated bearings in which the shaft fits accurately and can rotate.

If the operating medium used for the adjustment of the blades is a suitable oil, the latter can be used in part for lubricating the movable parts. In the embodiment of the drawing, for example, this applies to the surfaces with which the members rest in the hub 5 and which move relatively to the said hub during the adjustment of the blades.

The inner member might, for example, also be designed without the central shaft 11, comprising instead only the vanes 12, which thus lie like a fork in the outer member, the shaft 11 being secured to the outer member. The outer member might also be designed with such a fork, the tongues of which are formed by the counter-vanes 15, while the inner member comprises a hollow body of revolution, such as 14. The structure according to the drawing is, however, to be preferred with a view to an adequate support for the blades.

What I claim is:

1. Propeller system, particularly for movement in a liquid, including a hub, blades for controllable pitch rotatably journaled in said hub, said blades including at least a pair of blades disposed diametrally of each other at said hub, a pitch change motor operatively connected to said blades for controlling the pitch thereof, said pitch change motor being of the type which comprises a cylindrical inner member and a cylindrical outer member housing the inner member, both said members being disposed for rotational displacement individually and relatively to each other, said members being respectively provided with an equal number of outwardly projecting vanes and inwardly projecting counter-vanes, said vanes being extended radially outwards to the inner surface of the outer cylindrical member so as to bear sealingly against the same, said counter-vanes being extended radially inwards to the outer surface of the inner cylindrical member so as to bear sealingly against the same; said hub being shaped so as to provide a cavity within the center part thereof, said members being housed within and extended substantially through said cavity, and supported by said hub rotationally about the axis of rotational displacement of the blades, one of said cylindrical members being mounted at one blade of said pair of diametrally disposed blades, the other cylindrical member being mounted at the other blade of said pair; fluid conduits leading through the shaft of the propeller and connecting to said motor a controllable source of pressure fluid for the remote control of said motor; said conduits opening into the spaces between vanes and counter-vanes for supplying therebetween, and discharging therefrom, pressure fluid for operating and controlling the rotational displacement of said members and said blades relatively to each other between contact of vanes and counter-vanes on the one side and contact of vanes and counter-vanes on the other side.

2. Propeller system as set forth in claim 1 wherein said cavity is shaped with annular recesses, one for each one of said members for centering and seating the same thereon; each of said members being integrally formed with the blade appertaining thereto and further forming a pivot for said blade for the rotational displacement thereof upon said seating recess.

3. Propeller system, particularly for movement in a liquid, including a hub, a pair of blades for controllable pitch rotatably journaled within said hub and disposed diametrally opposite each other, a pitch change motor including a cylindrical inner member and a cylindrical outer member housing the inner member, both said members being disposed for rotational displacement individually and relatively to each other, one member being integrally formed with the one blade, the other member being integrally formed with the opposite blade of said pair; said inner member and said outer member being respectively provided with an equal number of outwardly projecting vanes and inwardly projecting counter-vanes, said vanes being extended radially outwards to the inner surface of the outer cylindrical member so as to bear sealingly against the same, said counter-vanes being extended radially inwards to the outer surface of the inner cylindrical member so as to bear sealingly against the same; said hub being shaped so as to provide a cavity within the center part thereof, said members being housed within and extended substantially through said cavity, said cavity being further shaped with annular seating recesses oppositely disposed on the common axis of rotational displacement of the blades, said members being seated and centered upon said recesses rotational about said common axis; each of said members being shaped as a pivot for its respective blade for the rotational displacement of the blade upon and about said recess; fluid conduits leading through the shaft of the propeller and connecting to said motor a controllable source of pressure fluid for the remote control of said motor; said conduits opening into the spaces between vanes and counter-vanes for supplying therebetween, and discharging therefrom, pressure fluid for operating and controlling the rotational displacement of said members and said blades relatively to each other between contact of vanes and counter-vanes on the one side and contact of vanes and counter-vanes on the other side.

4. Propeller system as set forth in claim 1 wherein said inner member is a center shaft carrying said vanes, said shaft having an extension, the blade opposite said center shaft having a conformably shaped recess in the base thereof, said shaft extension reaching into said recess thereby to form a pivot of said blade.

5. Propeller system as set forth in claim 1 wherein said inner member is a center shaft carrying said vanes, said shaft having an extension, the blade opposite said center shaft having a conformably shaped recess in the base thereof, said shaft extension reaching into said recess thereby to form a pivot of said blade; said center shaft being further provided with a cylindrical sleeve protruding around and at a radial distance from said shaft and disposed to be telescoped as a cap over the outer cylinder surface of the outer member, the wall of the outer member reaching to the bottom of said cap, both members thus mutually supporting each other.

6. Propeller system as set forth in claim 1 wherein said inner member is a center shaft carrying said vanes on the surface thereof, said center shaft projecting from an annular bottom surface confining the annular space between said cylindrical surfaces at the one end of said vanes and counter-vanes; said center shaft having at its free end a flange disc shaped and disposed so as to confine said annular space at the other end of said vanes and counter-vanes; said disc at its reverse side being disposed and shaped so as to bear closely upon a conformably shaped annular seat provided at said other end of said members.

7. Propeller system, particularly for movement in a liquid, including a hub, a pair of blades for controllable pitch rotatably journaled in said hub and disposed diametrally opposite each other, a pitch change motor operatively connected to said blades for controlling the pitch thereof, said pitch change motor including a cylindrical inner member and a cylindrical outer member housing the inner member, both said members being disposed for rotational displacement individually and relatively to each other; said inner and outer members being respectively provided with an equal number of outwardly projecting vanes and inwardly projecting counter-vanes, said vanes being extended radially outwards to the inner surface of the outer cylindrical member so as to bear sealingly against the same, said counter-vanes being extended radially inwards to the outer surface of the inner cylindrical member so as to bear sealingly against the same; said hub being shaped with a cavity in its center part, said cavity being shaped and disposed to house said members centrally therein, said members being extended substantially through said cavity; the roots of the blades being each formed as a body of rotation and said hub having conformably shaped bearings to carry said roots therein, said roots being provided at their bases with flanges, oppositely disposed seats being provided within said cavity to seat said flanges thereon; cylindrical extensions projecting from said flanges towards each other disposed and shaped to be telescoped into each other, the inner of said telescoped extensions being shaped and disposed to reach the base of the opposite blade and to serve as said outer member carrying said inwardly projecting counter-vanes, the base of the other blade having a center shaft projecting therefrom and serving as said inner member with said outwardly projecting vanes thereon, the base of the blade opposite thereto having a cylindrical recess therein, the head of said center shaft being extended into said cylindrical recess so as to serve as a pivot therefor; both said blades thus supporting each other at their roots and serving mutually as journals and bearings for rotational displacement relatively to each other; fluid conduits leading through the shaft of the propeller and connecting to said motor a controllable source of pressure fluid for the remote control of the motor, said conduits opening into the spaces between vanes and counter-vanes for supplying therebetween, and discharging therefrom, said pressure fluid for operating and controlling the rotational displacement of said members relatively to each other.

8. Propeller system as set forth in claim 7 wherein the outer one of the cylindrical flange extensions covers only part of the length of the inner extension, the free outer faces of both extensions being each provided with a toothed rim, gear wheels being associated with said toothed rims for engagement therewith, said gear wheels being provided within said cavity of the hub and rotatably but not displaceably mounted therein, thereby to ensure for both blades pitch varying rotational displacements about the same angles but in opposite senses of rotation.

9. Propeller system, particularly for movement in a liquid, including a hub, blades for controllable pitch rotatably journaled in said hub, said blades including at least a pair of blades disposed diametrally of each other at said hub, a pitch change motor operatively connected to said blades for controlling the pitch thereof, said pitch change motor including a pair of members concentrically disposed for rotational displacement individually and relatively to each other, means associated with both said members for operatively interengaging the same, said means comprising an equal number of outwardly projecting vanes and inwardly projecting counter-vanes; said members having coaxial cylindrical surfaces, spaced apart from each other, said vanes being disposed at the inner of said coaxial cylindrical surfaces and extended outwardly to the outer of said surfaces so as to bear sealingly against said outer surface, and said counter-vanes being disposed at the outer of said cylindrical surfaces and extended inwardly to the inner of said cylindrical surfaces so as to bear against said inner surface; said hub being shaped with a cavity within the center part thereof, said members being housed in said cavity, extended substantially therethrough and supported therein rotationally about the axis of rotational displacement of the blades, each member of said pair being disposed for direct coupling with a blade of said pair of diametrally disposed blades; fluid conduits leading through the shaft of the propeller and connecting a controllable source of pressure fluid, for the remote control of the motor, to the spaces between said vanes and counter-vanes for supplying therebetween, and discharging therefrom, pressure fluid for operating and controlling the rotational displacement of said members and blades relatively to each other.

References Cited in the file of this patent

UNITED STATES PATENTS

| 2,013,647 | Bace | Sept. 10, 1935 |
| 2,573,783 | Anderson et al. | Nov. 6, 1951 |

FOREIGN PATENTS

| 122,144 | Australia | Sept. 12, 1946 |
| 346,563 | Germany | Jan. 4, 1922 |